United States Patent
Madhira et al.

(10) Patent No.: US 11,381,276 B1
(45) Date of Patent: Jul. 5, 2022

(54) SYSTEM AND METHOD FOR FACILITATING ADAPTIVE FREQUENCY HOPPING IN COMMUNICATION SYSTEMS

(71) Applicant: NXP USA, Inc., Austin, TX (US)

(72) Inventors: Sriharsha Madhira, Hyderabad (IN); Akash Sanjay Kambale, Vita (IN)

(73) Assignee: NXP USA, Inc., Austin, TX (US)

( * ) Notice: Subject to any disclaimer, the term of this patent is extended or adjusted under 35 U.S.C. 154(b) by 16 days.

(21) Appl. No.: 17/247,862

(22) Filed: Dec. 28, 2020

(51) Int. Cl.
  *H04B 1/00* (2006.01)
  *H04B 1/715* (2011.01)
  *H04B 1/7136* (2011.01)
  *H04W 72/10* (2009.01)
  *H04W 72/04* (2009.01)

(52) U.S. Cl.
  CPC ........... *H04B 1/715* (2013.01); *H04B 1/7136* (2013.01); *H04W 72/0453* (2013.01); *H04W 72/10* (2013.01); *H04B 2001/7152* (2013.01); *H04B 2001/71362* (2013.01)

(58) Field of Classification Search
  CPC ........ H04B 2001/07154; H04B 1/7143; H04B 1/7136; H04B 1/7156; H04W 72/0446; H04W 4/008
  USPC .................................................. 375/132, 136
  See application file for complete search history.

(56) References Cited

U.S. PATENT DOCUMENTS

| | | |
|---|---|---|
| 8,310,964 B2 | 11/2012 | Grushkevich |
| 8,787,468 B2 | 7/2014 | Truong et al. |
| 9,743,220 B2 | 8/2017 | Shahar et al. |
| 10,128,902 B1 | 11/2018 | Cheung et al. |
| 2016/0381572 A1* | 12/2016 | Shahar ..................... H04W 4/80 455/41.2 |
| 2021/0068118 A1* | 3/2021 | Uln ........................ H04B 17/345 |
| 2021/0377958 A1* | 12/2021 | Lee ....................... H04W 72/082 |

OTHER PUBLICATIONS

Popovski, P. et al. "Dynamic Adaptive Frequency Hopping for Mutually Interfering Wireless Personal Area Networks", IEEE Transactions on Mobile Computing, vol. 5, No. 8, pp. 991-1003 (Aug. 2006).
Wang, et al. "Priority-based Adaptive Frequency Hopping for Blueooth in Multi-piconet Environments", IEEE 3rd International Conference on Consumer Electronics, Communications and Networks, pp. 444-449 (Nov. 2013).

* cited by examiner

*Primary Examiner* — Khai Tran (57) ABSTRACT

A frequency hopping device is co-located with a set of frequency hopping devices, and includes a controller that is configured to identify from a plurality of channels, first and second sets of channels that are available and unavailable for an adaptive frequency hopping (AFH) operation associated with the frequency hopping device, respectively. The controller is further configured to assign a lowest priority level to each channel of the second set of channels, an intermediate priority level to each channel of the first set of channels that is to be utilized by the set of frequency hopping devices, and a highest priority level to each remaining channel of the first set of channels. Further, the controller is configured to generate an AFH map based on a number of channels that have the highest priority level, and execute the AFH operation based on the AFH map.

20 Claims, 5 Drawing Sheets

FIG. 1

SYSTEM AND METHOD FOR FACILITATING ADAPTIVE FREQUENCY HOPPING IN COMMUNICATION SYSTEMS

BACKGROUND

The present disclosure relates generally to communication systems, and, more particularly, to a system and a method for facilitating adaptive frequency hopping in communication systems.

In communication systems, various frequency hopping devices (e.g., Bluetooth devices) are co-located with each other (i.e., located in a vicinity of each other) and with various fixed frequency devices (e.g., a wireless local area network device). Each frequency hopping device generates an adaptive frequency hopping (AFH) map that indicates channels (i.e., frequencies) that are available to be utilized for AFH operations (i.e., for establishing communication with a corresponding peer device) and channels that are unavailable for the AFH operations. The channels that are unavailable for the AFH operations include channels that are blocked for the AFH operations by an associated host processor, channels that have a packet error rate (PER) greater than a threshold value, and channels that are utilized by the fixed frequency devices. However, in a communication system, one frequency hopping device is unable to identify channels that are to be utilized for the AFH operations by other co-located frequency hopping devices. Hence, all the frequency hopping devices of the communication system may include all the available channels in the corresponding AFH maps, thereby resulting in self-interference in the frequency hopping devices. Typically, to avoid the self-interference, each frequency hopping device generates a predefined AFH map. However, in such a scenario, a significant number of available channels of the predefined AFH map may overlap with those utilized by the fixed frequency devices. As a result, a PER of such channels significantly increases, thereby degrading a performance (i.e., a throughput) of the corresponding frequency hopping device. Therefore, there exists a need for a technical solution that solves the aforementioned problems of conventional techniques of facilitating AFH operations in communication systems.

SUMMARY

In one embodiment of the present disclosure, a frequency hopping device co-located with a set of frequency hopping devices is disclosed. The frequency hopping device includes a controller that is configured to identify from a plurality of channels associated with a frequency hopping protocol, first and second sets of channels that are available and unavailable for an adaptive frequency hopping (AFH) operation associated with the frequency hopping device, respectively. The controller is further configured to identify from the first set of channels, a first subset of channels that is to be utilized by the set of frequency hopping devices for a set of AFH operations associated therewith. Further, the controller is configured to assign, based on the first subset of channels, a second subset of channels of the first set of channels, and the second set of channels, a first priority level to each channel of the second subset of channels. The controller is further configured to determine whether a number of channels having the first priority level is greater than or equal to a first threshold value. Further, the controller is configured to generate an AFH map associated with the frequency hopping device based on the determination of whether the number of channels having the first priority level is greater than or equal to the first threshold value. Based on the generated AFH map, the controller is further configured to execute the AFH operation.

In another embodiment of the present disclosure, a communication system is disclosed. The communication system includes a plurality of frequency hopping devices that are co-located with each other. A frequency hopping device of the plurality of frequency hopping devices comprises a controller. The controller is configured to identify from a plurality of channels associated with a frequency hopping protocol, first and second sets of channels that are available and unavailable for an adaptive frequency hopping (AFH) operation associated with the frequency hopping device, respectively. Further, the controller is configured to identify from the first set of channels, a first subset of channels that is to be utilized by remaining frequency hopping devices of the plurality of frequency hopping devices for one or more AFH operations associated therewith. The controller is further configured to assign based on the first subset of channels, a second subset of channels of the first set of channels, and the second set of channels, a first priority level to each channel of the second subset of channels. Further, the controller is configured to determine whether a number of channels having the first priority level is greater than or equal to a first threshold value. Based on the determination of whether the number of channels having the first priority level is greater than or equal to the first threshold value, the controller is further configured to generate an AFH map associated with the frequency hopping device. Further, the controller is configured to execute the AFH operation based on the generated AFH map.

In yet another embodiment, a method for facilitating adaptive frequency hopping (AFH) in a communication system by a frequency hopping device of the communication system is disclosed. The method includes identifying from a plurality of channels associated with a frequency hopping protocol, first and second sets of channels that are available and unavailable for an adaptive frequency hopping (AFH) operation associated with the frequency hopping device, respectively. The method further includes identifying from the first set of channels, a first subset of channels to be utilized by a set of frequency hopping devices of the communication system for a set of AFH operations associated therewith. The set of frequency hopping devices is co-located with the frequency hopping device. Further, the method includes assigning, based on the first subset of channels, a second subset of channels of the first set of channels, and the second set of channels, a first priority level to each channel of the second subset of channels. The method further includes determining whether a number of channels having the first priority level is greater than or equal to a first threshold value. Further, the method includes generating an AFH map associated with the frequency hopping device based on the determination of whether the number of channels having the first priority level is greater than or equal to the first threshold value. The method further includes executing the AFH operation based on the generated AFH map.

In some embodiments, when the controller determines that the number of channels having the first priority level is greater than or equal to the first threshold value, the AFH map indicates that the second subset of channels is to be utilized for the AFH operation and the first subset of channels and the second set of channels are unavailable for the AFH operation.

In some embodiments, the controller is further configured to assign, based on the first subset of channels and the second set of channels, a second priority level to each channel of the first subset of channels and a third priority level to each channel of the second set of channels.

In some embodiments, when the controller determines that the number of channels having the first priority level is less than the first threshold value, the controller is further configured to update priority levels of one or more channels of the first subset of channels from the second priority level to the first priority level. A number of channels with the updated priority levels is equal to a difference between the first threshold value and the number of channels of the second subset of channels. The AFH map indicates that the second subset of channels and the one or more channels of the first subset of channels are to be utilized for the AFH operation, and remaining channels of the first subset of channels and the second set of channels are unavailable for the AFH operation.

In some embodiments, the controller is further configured to generate first priority data that is indicative of the first through third priority levels assigned to the second and first subsets of channels and the second set of channels, respectively. The first subset of channels to be utilized by the set of frequency hopping devices for the set of AFH operations associated therewith is are updated based on the first priority data.

In some embodiments, the frequency hopping device further includes a sensing circuit that is configured to determine a packet error rate (PER) of each channel of the plurality of channels. The sensing circuit is further configured to identify a third set of channels from the plurality of channels such that a PER of each channel of the third set of channels is greater than a second threshold value. Further, the sensing circuit is configured to generate first sense data that is indicative of the identified third set of channels.

In some embodiments, the controller is coupled with the sensing circuit and a host processor associated with the frequency hopping device, and further configured to receive the first sense data from the sensing circuit and host data from the host processor. The host data is indicative of a fourth set of channels of the plurality of channels that is blocked for the AFH operation by the host processor. The controller identifies the first and second sets of channels based on the first sense data and the host data.

In some embodiments, the controller is further configured to receive second sense data that is indicative of a fifth set of channels identified from the plurality of channels by the set of frequency hopping devices such that a PER of each channel of the fifth set of channels is greater than the second threshold value. The controller further identifies the first and second sets of channels based on the second sense data.

In some embodiments, the controller is further configured to receive, from the host processor, fixed frequency data that is indicative of a sixth set of channels of the plurality of channels. The sixth set of channels is utilized by a fixed frequency device that is co-located with the frequency hopping device and the set of frequency hopping devices. The controller further identifies the first and second sets of channels based on the fixed frequency data.

In some embodiments, the controller is further configured to receive second priority data that is indicative of one or more priority levels assigned to each channel of the plurality of channels by the set of frequency hopping devices. The controller identifies the first subset of channels from the first set of channels based on the second priority data.

Various embodiments of the present disclosure disclose a frequency hopping device co-located with a set of frequency hopping devices in a communication system. The frequency hopping device includes a controller that is configured to identify from various channels associated with a frequency hopping protocol, a set of channels that is available for an adaptive frequency hopping (AFH) operation associated with the frequency hopping device and another set of channels that is unavailable for the AFH operation. The frequency hopping device may be a Bluetooth device, and the frequency hopping protocol may be a Bluetooth protocol. The controller is further configured to identify from the set of channels that is available for the AFH operation, a subset of channels that is to be utilized by the set of frequency hopping devices for a set of AFH operations associated therewith. The controller is further configured to assign a lowest priority level to each channel of the set of channels that is unavailable for the AFH operation, an intermediate priority level to each channel of the identified subset of channels, and a highest priority level to each remaining channel of the set of channels that is available for the AFH operation. Further, the controller is configured to determine whether a number of channels having the highest priority level is greater than or equal to a threshold value. Based on the determination of whether the number of channels having the highest priority level is greater than or equal to the threshold value, the controller is further configured to generate an AFH map associated with the frequency hopping device. Further, based on the generated AFH map, the controller is configured to execute the AFH operation.

Thus, in the communication system of the present disclosure, AFH maps are dynamically generated based on the identification of channels that are unavailable for AFH operations and channels that are to be utilized by various co-located frequency hopping devices. As a result, a number of channels that is shared by multiple devices in the communication system (such as the frequency hopping device, the set of frequency hopping devices, a fixed frequency device, or the like) significantly reduces. Thus, a performance (i.e., a throughput) of the frequency hopping device of the present disclosure is significantly greater than that of a conventional frequency hopping device that utilizes a predefined AFH map for executing an AFH operation.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
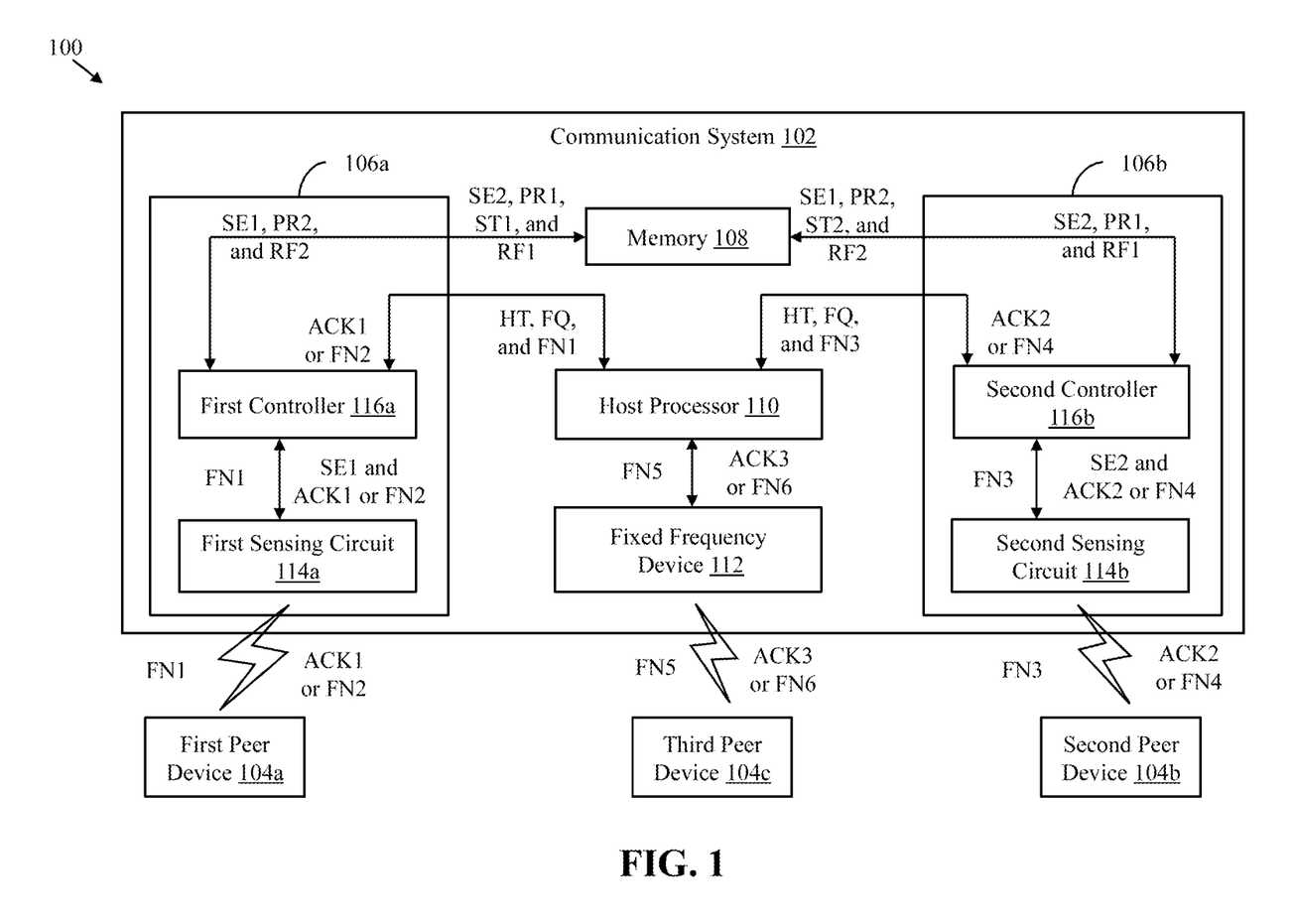
FIG. 1 illustrates a schematic block diagram of a wireless network environment in accordance with an embodiment of the present disclosure.

FIG. 1 illustrates a schematic block diagram of a wireless network environment 100 in accordance with an embodiment of the present disclosure. The wireless network environment 100 includes a communication system 102 and first through third peer devices 104a-104c. The wireless network environment 100 may correspond to a computing system, a network system, an automotive system, or the like.

The communication system 102 includes a plurality of frequency hopping devices. The plurality of frequency hopping devices include a first frequency hopping device 106a and a set of frequency hopping devices of which a second frequency hopping device 106b is shown. In other words, the communication system 102 includes the first and second frequency hopping devices 106a and 106b. The communication system 102 further includes a memory 108, a host processor 110, and a fixed frequency device 112. The communication system 102 may correspond to a system-on-chip, a printed circuit board, a computing device (e.g., a laptop) with the first and second frequency hopping devices 106a and 106b connected thereto, or the like. Although it is described that the communication system 102 includes the fixed frequency device 112, the scope of the present disclosure is not limited to it. In an alternate embodiment, the fixed frequency device 112 may be absent from the communication system 102, without deviating from the scope of the present disclosure.

The first and second frequency hopping devices 106a and 106b are co-located with each other. The first and second frequency hopping devices 106a and 106b are further co-located with the fixed frequency device 112. In other words, the first and second frequency hopping devices 106a and 106b and the fixed frequency device 112 are located in a vicinity of each other in the communication system 102.

The first and second frequency hopping devices 106a and 106b are wirelessly coupled with the first and second peer devices 104a and 104b, respectively, and communicate therewith by way of an adaptive frequency hopping (AFH) technique (i.e., by executing various AFH operations). The communication between the first frequency hopping device 106a and the first peer device 104a, and between the second frequency hopping device 106b and the second peer device 104b is in accordance with a frequency hopping protocol. For the sake of ongoing discussion, it is assumed that the first and second frequency hopping devices 106a and 106b are Bluetooth (BT) devices and the frequency hopping protocol is a BT protocol. However, it will be apparent to a person skilled in the art that the scope of the present disclosure is not limited to the first and second frequency hopping devices 106a and 106b being BT devices and the frequency hopping protocol being a BT protocol. In various other embodiments, any other frequency hopping device that operates in accordance with an associated protocol may be included in the communication system 102, without deviating from the scope of the present disclosure. Each frequency hopping device of the first and second frequency hopping devices 106a and 106b includes a sensing circuit and a controller. For example, the first frequency hopping device 106a includes a first sensing circuit 114a and a first controller 116a, and the second frequency hopping device 106b includes a second sensing circuit 114b and a second controller 116b.

The first sensing circuit 114a may include one or more radio frequency antennas (not shown). The first sensing circuit 114a may further include suitable logic, circuitry, interfaces, and/or code, executable by the circuitry, that may be configured to perform one or more operations. For example, the first sensing circuit 114a is configured to determine a packet error rate (PER) of each channel of a plurality of channels associated with the frequency hopping protocol. For example, in the BT protocol, channels (i.e., frequencies) in the range of 2.402 giga-hertz (GHz) to 2.480 GHz are reserved for BT communication. The plurality of channels associated with the frequency hopping protocol corresponds to such channels. Thus, in an example, the plurality of channels include a total of 79 channels of 1 mega-hertz (MHz) frequency each. Further, the first sensing circuit 114a is configured to identify a first set of channels from the plurality of channels such that a PER of each channel of the first set of channels is greater than a first threshold value. Such channels correspond to noisy channels. The first sensing circuit 114a is further configured to generate first sense data SE1 that is indicative of the identified first set of channels.

The first controller 116a is coupled with the first sensing circuit 114a. The first controller 116a may include suitable logic, circuitry, interfaces, and/or code, executable by the circuitry, that may be configured to perform one or more operations. For example, the first controller 116a is configured to receive the first sense data SE1 from the first sensing circuit 114a. The first controller 116a is further coupled with the memory 108, and configured to receive first status data ST1 from the memory 108. It will be apparent to a person skilled in the art that the first controller 116a receives the first status data ST1 from the memory 108 as a response to a first query (not shown) transmitted to the memory 108 by the first controller 116a. The first status data ST1 is indicative of an activation status of the second frequency hopping device 106b. For the sake of ongoing discussion, it is assumed that the second frequency hopping device 106b is active.

The first controller 116a is further configured to receive second sense data SE2 from the memory 108. It will be apparent to a person skilled in the art that the first controller 116a receives the second sense data SE2 from the memory 108 as a response to a second query (not shown) transmitted to the memory 108 by the first controller 116a. The second sense data SE2 is stored in the memory 108 by the second controller 116b. The second sense data SE2 indicates a second set of channels that is identified from the plurality of channels by the second frequency hopping device 106b (i.e., the second sensing circuit 114b). The second frequency hopping device 106b identifies the second set of channels from the plurality of channels in a similar manner as described above. Hence, each channel of the second set of channels has a PER that is greater than the first threshold value. Although it is described that a same threshold value (i.e., the first threshold value) is utilized for identifying the first and second sets of channels from the plurality of channels, it will be apparent to a person skilled in the art that the scope of the present disclosure is not limited to it. In various other embodiments, a separate threshold value may be utilized for identifying the first and second sets of channels from the plurality of channels, without deviating from the scope of the present disclosure.

The first controller 116a is further coupled with the host processor 110 that is associated with the first frequency hopping device 106a, and further configured to receive host data HT. The host data HT is indicative of a third set of channels of the plurality of channels that is blocked for AFH operations (such as a first AFH operation associated with the first frequency hopping device 106a) by the host processor 110. The first controller 116a is further configured to receive fixed frequency data FQ from the host processor 110. The fixed frequency data FQ is indicative of a fourth set of channels of the plurality of channels. The fourth set of channels is utilized by the fixed frequency device 112 for executing corresponding operations. The fixed frequency device 112 corresponds to a device that communicates with an associated peer device (such as the third peer device 104*c*) over a fixed frequency spectrum (i.e., sans the AFH technique). For the sake of ongoing discussion, it is assumed that the fixed frequency device 112 is a wireless local area network (WLAN) device. However, it will be apparent to a person skilled in the art that the scope of the present disclosure is not limited to the fixed frequency device 112 being a WLAN device. In various other embodiments, any other fixed frequency device may be included in the communication system 102, without deviating from the scope of the present disclosure.

The first controller 116*a* is further configured to identify from the plurality of channels, fifth and sixth sets of channels that are unavailable and available for the first AFH operation associated with the first frequency hopping device 106*a*, respectively. The first controller 116*a* identifies the fifth and sixth sets of channels based on the first and second sense data SE1 and SE2, the host data HT, and the fixed frequency data FQ. For example, the fifth and sixth sets of channels are identified such that the fifth set of channels includes the first through fourth sets of channels and the sixth set of channels includes remaining channels of the plurality of channels (i.e., channels not included in the first through fourth sets of channels). In one example, each channel included in the first through fourth sets of channels is unique. In another example, one or more channels may be included in two or more sets of channels of the first through fourth sets of channels.

Although it is described that the first controller 116*a* identifies the fifth and sixth sets of channels based on the fixed frequency data FQ, the scope of the present disclosure is not limited to it. In an alternate embodiment, when the fixed frequency device 112 is absent from the communication system 102, the first controller 116*a* may identify the fifth and sixth sets of channels exclusively based on the first and second sense data SE1 and SE2 and the host data HT, without deviating from the scope of the present disclosure. In such a scenario, the fifth and sixth sets of channels are identified such that the fifth set of channels includes the first through third sets of channels and the sixth set of channels includes remaining channels of the plurality of channels (i.e., channels not included in the first through third sets of channels) Similarly, although it is described that the fifth set of channels includes the second set of channels (i.e., the second set of channels is unavailable for the AFH operations), the scope of the present disclosure is not limited to it. In various other embodiments, the first controller 116*a* may identify the fifth and sixth sets of channels such that various channels of the second set of channels may be included in the sixth set of channels, without deviating from the scope of the present disclosure. In other words, the channels identified to have a PER greater than the first threshold value by the second frequency hopping device 106*b* may be included in the set of channels that are available for the first AFH operation (i.e., the sixth set of channels).

The first controller 116*a* is further configured to receive first priority data PR1 from the memory 108. It will be apparent to a person skilled in the art that the first controller 116*a* receives the first priority data PR1 from the memory 108 as a response to a third query (not shown) transmitted to the memory 108 by the first controller 116*a*. The first priority data PR1 is stored in the memory 108 by the second controller 116*b*. The first priority data PR1 is indicative of one or more priority levels assigned to each channel of the plurality of channels by the second frequency hopping device 106*b* (i.e., the second controller 116*b*). Such priority levels may include first through third priority levels. In an embodiment, channels having the first priority level are to be utilized for the second AFH operation. Further, channels having the second priority level are not to be utilized for the second AFH operation. Similarly, channels having the third priority level are unavailable for a second AFH operation associated with the second frequency hopping device 106*b*.

The first controller 116*a* is further configured to identify from the sixth set of channels based on the first priority data PR1, a first subset of channels that is to be utilized by the second frequency hopping device 106*b* for the second AFH operation. Hence, the first subset of channels corresponds to channels having the first priority level assigned thereto by the second frequency hopping device 106*b*. The sixth set of channels thus includes the first subset of channels that is to be utilized by the second frequency hopping device 106*b* for the second AFH operation and a second subset of channels (i.e., remaining channels of the sixth set of channels that are not included in the first subset of channels). Thus, the second subset of channels corresponds to channels that are to be utilized for the first AFH operation.

The first controller 116*a* is further configured to receive first reference data RF1 from the memory 108. It will be apparent to a person skilled in the art that the first controller 116*a* receives the first reference data RF1 as a response to a fourth query (not shown) transmitted to the memory 108 by the first controller 116*a*. The first reference data RF1 is stored in the memory 108 by the second controller 116*b*. In one embodiment, the first reference data RF1 includes a first start frequency value that is indicative of a start channel of the first subset of channels. The first reference data RF1 further includes a first direction value that indicates whether a next channel of the first subset of channels corresponds to a channel of a frequency greater than that of the start channel or less than that of the start channel. For the sake of ongoing discussion, it is assumed that a difference between two channels of the first subset of channels is 1 MHz. When the next channel of the first subset of channels corresponds to the channel of a frequency greater than that of the start channel, the first direction value is equal to 1. Further, when the next channel of the first subset of channels corresponds to the channel of a frequency less than that of the start channel, the first direction value is equal to −1. Thus, if the first start frequency value is equal to 2456 MHz and the first direction value is equal to 1, the first subset of channels includes channels of frequencies 2456 MHz, 2457 MHz, 2458 MHz, and so on.

The first controller 116*a* is further configured to generate second reference data RF2 based on the identified fifth set of channels, the identified first subset of channels, the second subset of channels, and the first reference data RF1. The second reference data RF2 includes a second start frequency value indicative of a start channel of the second subset of channels and a second direction value that is complementary to the first direction value. For example, if the first direction value is equal to −1, the second direction value is equal to 1. Conversely, if the first direction value is equal to 1, the second direction value is equal to −1.

The first controller 116*a* is further configured to assign one of the first through third priority levels to each channel of the plurality of channels based on the identified fifth set of channels, the identified first subset of channels, the second subset of channels, and the second reference data RF2. For example, the first controller 116a is further configured to assign, based on the first subset of channels and the fifth set of channels, the second priority level to each channel of the first subset of channels and the third priority level to each channel of the fifth set of channels. Further, the first controller 116a is further configured to assign, based on the fifth set of channels, the first and second subsets of channels, and the second reference data RF2, the first priority level to each channel of the second subset of channels. In one embodiment, the first priority level is the highest priority level of the first through first priority levels, the third priority level is the lowest priority level of the first through first priority levels, and the second priority level is an intermediate priority level between the first and third priority levels. Further, the first controller 116a may initially assign the third and second priority levels to the fifth set of channels and the first subset of channels, respectively, and then assign the first priority level to each channel of the second subset of channels in a circular manner based on the second reference data RF2. In one embodiment, the channels of each of the fifth set of channels, the first subset of channels, and the second subset of channels are contiguous. In another embodiment, the channels of each of the fifth set of channels, the first subset of channels, and the second subset of channels are noncontiguous.

The first controller 116a is further configured to determine whether a number of channels having the first priority level is greater than or equal to a second threshold value. The second threshold value is a sum of a minimum number of channels required for establishing communication in the frequency hopping protocol and a number of buffer channels. The minimum number of channels required for establishing communication in the BT protocol is equal to 21. Thus, in one example, considering the number of buffer channels to be equal to 5, the second threshold value is equal to 26. It will be apparent to a person skilled in the art that the scope of the present disclosure is not limited to the second threshold value being a fixed value. In various other embodiments, the second threshold value may vary based on a number frequency hopping devices included in the communication system 102, without deviating from the scope of the present disclosure. The first controller 116a is further configured to generate a first AFH map (not shown) associated with the first frequency hopping device 106a based on the determination of whether the number of channels having the first priority level is greater than or equal to the second threshold value.

When the first controller 116a determines that the number of channels having the first priority level is greater than or equal to the second threshold value, the first AFH map indicates that the second subset of channels is to be utilized for the first AFH operation, and the first subset of channels and the fifth set of channels are unavailable for the first AFH operation. For example, if the number of channels having the first priority level is equal to 30, the first AFH map indicates that 30 channels are to be utilized for the first AFH operation, and the remaining channels of the plurality of channels (i.e., the first subset of channels and the fifth set of channels) are unavailable for the first AFH operation.

When the first controller 116a determines that the number of channels having the first priority level is less than the second threshold value, the first controller 116a is further configured to update priority levels of one or more channels of the first subset of channels from the second priority level to the first priority level. A number of channels with the updated priority levels is equal to a difference between the second threshold value and a number of channels of the second subset of channels. In one embodiment, a self-interference of each channel of the one or more channels is less than that of each remaining channel of the first subset of channels. The first AFH map thus indicates that the second subset of channels and the one or more channels of the first subset of channels are to be utilized for the first AFH operation, and the remaining channels of the first subset of channels and the fifth set of channels are unavailable for the first AFH operation. For example, if the number of channels of the second subset of channels is equal to 22 and the second threshold value is equal to 26, the first controller 116a is configured to update the priority levels of 4 channels of the first subset of channels from the second priority level to the first priority level. In such a scenario, the first AFH map indicates that 22 channels of the second subset of channels and 4 channels of the first subset of channels are to be utilized for the first AFH operation, and the remaining channels of the first subset of channels and the fifth set of channels are unavailable for the first AFH operation.

As the first subset of channels corresponds to channels that are to be utilized by the second frequency hopping device 106b, the one or more channels may be shared by the first and second frequency hopping devices 106a and 106b for executing the corresponding first and second AFH operations. The one or more channels may be shared if the number of channels to be utilized for the second AFH operation by the second frequency hopping device 106b is equal to the second threshold value. For example, if the number of channels to be utilized by the second frequency hopping device 106b (i.e., if the number of channels of the first subset of channels) is 26, 4 channels with updated priority levels are shared by the first and second frequency hopping devices 106a and 106b. Alternatively, if the number of channels to be utilized by the second frequency hopping device 106b is greater than the second threshold value, priority levels of various channels to be utilized by the second frequency hopping device 106b may be updated from the first priority level to the second priority level in a second AFH map (not shown) generated by the second controller 116b.

If the difference between the number of channels to be utilized by the second frequency hopping device 106b and the second threshold value is greater than the number of channels of the first subset of channels with the updated priority levels, no channel is shared by the first and second frequency hopping devices 106a and 106b. For example, if the number of channels to be utilized by the second frequency hopping device 106b is equal to 32, priority levels of 4 such channels are updated from the first priority level to the second priority level in the second AFH map. The number of channels to be utilized by the second frequency hopping device 106b is thus equal to 28. As a result, in such a scenario, no channel is shared by the first and second frequency hopping devices 106a and 106b. Conversely, the difference between the number of channels to be utilized by the second frequency hopping device 106b and the second threshold value (hereinafter referred to as an "intermediate value") may be less than the number of channels of the first subset of channels with the updated priority levels. In such a scenario, a number of channels shared by the first and second frequency hopping devices 106a and 106b is equal to a difference between the number of channels of the first subset of channels with the updated priority levels and the intermediate value. For example, if the number of channels to be utilized by the second frequency hopping device 106b is equal to 28, priority levels of 2 such channels are updated from the first priority level to the second priority level in the second AFH map and 2 channels are shared by the first and second frequency hopping devices 106a and 106b.

Although it is described that each channel of the plurality of channels is assigned one of three priority levels (i.e., the first through third priority levels), it will be apparent to a person skilled in the art that the scope of the present disclosure is not limited it. In various other embodiments, the first controller 116a may be configured to assign more than three priority levels based on a number of frequency hopping devices included in the communication system 102, without deviating from the scope of the present disclosure.

The first controller 116a is further configured to generate second priority data PR2 that is indicative of the first through third priority levels assigned to the second and first subsets of channels and the fifth set of channels, respectively, by the first controller 116a. The first controller 116a is further configured to store the second priority data PR2, the second reference data RF2, and the first sense data SE1 in the memory 108. The second priority data PR2, the second reference data RF2, and the first sense data SE1 may be utilized by the second frequency hopping device 106b to generate the second AFH map. As the second priority data PR2 is indicative of the first through third priority levels, including the updated priority levels, assigned to the plurality of channels by the first controller 116a, the number of channels to be utilized by the second frequency hopping device 106b for the second AFH operation may be updated based on the second priority data PR2. In other words, as described above, based on the second priority data PR2, priority levels of various channels that are to be utilized by the second frequency hopping device 106b may be updated from the first priority level to the second priority level. Further, based on the second priority data PR2, the number of channels shared by the first and second frequency hopping devices 106a and 106b is determined.

The first controller 116a is further configured to execute the first AFH operation based on the first AFH map. The execution of the first AFH operation enables communication between the first frequency hopping device 106a and the first peer device 104a. To facilitate the communication between the first frequency hopping device 106a and the first peer device 104a, the first controller 116a is further configured to receive first functional data FN1 that is to be transmitted to the first peer device 104a from the host processor 110. The first controller 116a is further configured to transmit the first functional data FN1 to the first peer device 104a by way of the first sensing circuit 114a by executing the first AFH operation. In response to the transmission of the first functional data FN1 to the first peer device 104a, the first controller 116a is further configured to receive, by way of the first sensing circuit 114a, a first acknowledgement ACK1 or second functional data FN2 from the first peer device 104a. The first controller 116a is further configured to transmit the received first acknowledgement ACK1 or the second functional data FN2 to the host processor 110.

It will be apparent to a person skilled in the art that the functionalities of the second sensing circuit 114b are similar to that of the first sensing circuit 114a. For example, the second sensing circuit 114b is configured to generate the second sense data SE2 in a manner similar to the generation of the first sense data SE1 by the first sensing circuit 114a. Further, it will be apparent to a person skilled in the art that the functionalities of the second controller 116b are similar to that of the first controller 116a. For example, the second controller 116b is configured to generate the second AFH map and execute the second AFH operation in a manner similar to the generation of the first AFH map and the execution of the first AFH operation by the first controller 116a, respectively.

The second controller 116b is further configured to generate the first priority data PR1 and store the first priority data PR1 and the second sense data SE2 in the memory 108. It will be apparent to a person skilled in the art that the generation of the first and second AFH maps may be an iterative process with the priority levels of various channels and subsequently the AFH maps being updated during each iteration. In one example, the first and second AFH maps are generated such that the number of channels to be utilized by the first and second frequency hopping devices 106a and 106b is equal. The second controller 116b may further be configured to receive, prior to the generation of the second AFH map and the execution of the second AFH operation, the second reference data RF2 and second status data ST2 that is indicative of an activation status of the first frequency hopping device 106a.

The execution of the second AFH operation enables communication between the second frequency hopping device 106b and the second peer device 104b. The second controller 116b facilitates the communication between the second frequency hopping device 106b and the second peer device 104b in a similar manner as described above. In other words, the second controller 116b is further configured to receive third functional data FN3 from the host processor 110, and transmit the third functional data FN3 to the second peer device 104b by way of the second sensing circuit 114b by executing the second AFH operation. In response to the transmission of the third functional data FN3 to the second peer device 104b, the second controller 116b is further configured to receive, by way of the second sensing circuit 114b, a second acknowledgement ACK2 or fourth functional data FN4 from the second peer device 104b. The second controller 116b is further configured to transmit the received second acknowledgement ACK2 or the fourth functional data FN4 to the host processor 110.

It will be apparent to a person skilled in the art that the plurality of frequency hopping devices is shown to include two frequency hopping devices (i.e., the first and second frequency hopping devices 106a and 106b) to make the illustrations concise and clear and should not be considered as a limitation of the present disclosure. In various other embodiments, the plurality of frequency hopping devices may include more than two frequency hopping devices, without deviating from the scope of the present disclosure. In such a scenario, the first frequency hopping device 106a may identify the first subset of channels from the sixth set of channels based on the priority data generated by each remaining frequency hopping device of the plurality of frequency hopping devices. In other words, the first subset of channels corresponds to channels that are to be utilized by the remaining frequency hopping devices of the plurality of frequency hopping devices for one or more AFH operations associated therewith.

The memory 108 is coupled between the first and second frequency hopping devices 106a and 106b (i.e., the first and second controllers 116a and 116b). In other words, the memory 108 is shared by the first and second frequency hopping devices 106a and 106b for facilitating the execution of the corresponding first and second AFH operations. Examples of the memory 108 include a random-access memory, a flash memory, or the like. The memory 108 may include suitable logic, circuitry, interfaces, and/or code, executable by the circuitry, that may be configured to perform one or more operations. For example, the memory 108 is configured to store the first and second sense data SE1 and SE2 and the first and second priority data PR1 and PR2. The memory 108 is further configured to transmit the first and second sense data SE1 and SE2 and the first and second priority data PR1 and PR2 to the first and second controllers 116a and 116b as responses to various queries received from the first and second controllers 116a and 116b.

The memory 108 is further configured to store the first and second status data ST1 and ST2 that are indicative of the activation statuses of the first and second frequency hopping devices 106a and 106b, respectively. In one embodiment, when the first and second frequency hopping devices 106a and 106b are inactive, the first and second status data ST1 and ST2 have a first predetermined value (e.g., '0'). Further, when the first and second frequency hopping devices 106a and 106b are active, the first and second status data ST1 and ST2 have a second predetermined value (e.g., '1'). The first and second status data ST1 and ST2 have the first predetermined value until the first and second frequency hopping devices 106a and 106b are activated. Upon activation, the first and second frequency hopping devices 106a and 106b (i.e., the first and second controllers 116a and 116b) are further configured to update the first and second status data ST1 and ST2 to the second predetermined value. The memory 108 is further configured to store the first and second reference data RF1 and RF2. Further, the memory 108 is configured to transmit the first and second status data ST1 and ST2 and the first and second reference data RF1 and RF2 to the first and second controllers 116a and 116b as responses to various queries received from the first and second controllers 116a and 116b.

It will be apparent to a person skilled in the art that the scope of the present disclosure is not limited to the communication system 102 including the memory 108 to facilitate transfer of data (such as the first and second sense data SE1 and SE2, the first and second priority data PR1 and PR2, the first and second status data ST1 and ST2, and the first and second reference data RF1 and RF2) between first and second frequency hopping devices 106a and 106b. In various other embodiments, the first and second frequency hopping devices 106a and 106b may be coupled with each other by way of signalling lines (not shown) to transfer data therebetween, or may transfer data by way of the host processor 110, without deviating from the scope of the present disclosure.

The host processor 110 is coupled with the first and second frequency hopping devices 106a and 106b (i.e., the first and second controllers 116a and 116b) and the fixed frequency device 112. The host processor 110 may include suitable logic, circuitry, interfaces, and/or code, executable by the circuitry, that may be configured to perform one or more operations. For example, the host processor 110 is configured to identify from the plurality of channels, the fourth set of channels that is to be utilized by the fixed frequency device 112, and generate the fixed frequency data FQ that is indicative of the identified fourth set of channels. Further, the host processor 110 is configured to block various channels (i.e., the third set of channels) for the AFH operations, and generate the host data HT that is indicative of the blocked channels. The host processor 110 is further configured to transmit the fixed frequency data FQ and the host data HT to the first and second controllers 116a and 116b.

The host processor 110 is further configured to generate and transmit various functional data to the frequency hopping and fixed frequency devices for transferring to the corresponding peer devices. For example, the host processor 110 is further configured to generate and transmit the first functional data FN1 and the third functional data FN3 to the first and second frequency hopping devices 106a and 106b (i.e., the first and second controllers 116a and 116b) for transferring to the first and second peer devices 104a and 104b, respectively. In response to the first functional data FN1, the host processor 110 is further configured to receive the first acknowledgement ACK1 or the second functional data FN2 from the first controller 116a. Similarly, in response to the third functional data FN3, the host processor 110 is further configured to receive the second acknowledgement ACK2 or the fourth functional data FN4 from the second controller 116b. The host processor 110 is further configured to generate and transmit fifth functional data FN5 to the fixed frequency device 112 for transferring to the third peer device 104c. In response to the fifth functional data FN5, the host processor 110 is further configured to receive a third acknowledgement ACK3 or sixth functional data FN6 from the fixed frequency device 112.

Although it is described that a single host processor (i.e., the host processor 110) is associated (i.e., coupled) with the first and second frequency hopping devices 106a and 106b and the fixed frequency device 112, the scope of the present disclosure is not limited to it. In various other embodiments, the first and second frequency hopping devices 106a and 106b and the fixed frequency device 112 may be coupled with three separate host processors, without deviating from the scope of the present disclosure. In such a scenario, each host processor may execute operations associated with the corresponding device (i.e., one of the first and second frequency hopping devices 106a and 106b and the fixed frequency device 112).

The fixed frequency device 112 is co-located with the first and second frequency hopping devices 106a and 106b and wirelessly coupled with the third peer device 104c. The fixed frequency device 112 may include suitable logic, circuitry, interfaces, and/or code, executable by the circuitry, that may be configured to perform one or more operations. For example, the fixed frequency device 112 is configured to receive the fifth functional data FN5 from the host processor 110, and transmit the fifth functional data FN5 to the third peer device 104c. The fixed frequency device 112 transmits the fifth functional data FN5 to the third peer device 104c over a fixed frequency spectrum. In response to the transmission of the fifth functional data FN5 to the third peer device 104c, the fixed frequency device 112 is further configured to receive the third acknowledgement ACK3 or the sixth functional data FN6. The fixed frequency device 112 is further configured to transmit the third acknowledgement ACK3 or the sixth functional data FN6 to the host processor 110.

It will be apparent to a person skilled in the art that the scope of the present disclosure is not limited to the communication system 102 comprising a single fixed frequency device (i.e., the fixed frequency device 112). In various other embodiments, the communication system 102 may include multiple fixed frequency devices that may be co-located with the frequency hopping devices (such as the first and second frequency hopping devices 106a and 106b), without deviating from the scope of the present disclosure.

The first through third peer devices 104a-104c are wirelessly coupled with the first and second frequency hopping devices 106a and 106b and the fixed frequency device 112, respectively. Each of the first through third peer devices 104a-104c may include suitable logic, circuitry, interfaces, and/or code, executable by the circuitry, that may be configured to perform one or more operations. For example, the first peer device 104a is configured to receive the first functional data FN1 from the first frequency hopping device 106a, and in response, generate and transmit the first acknowledgement ACK1 or the second functional data FN2 to the first frequency hopping device 106a. Similarly, the second and third peer devices 104b and 104c are configured to receive the third and fifth functional data FN3 and FN5 from the second frequency hopping device 106b and the fixed frequency device 112, respectively. Further, in response to the third functional data FN3, the second peer device 104b is configured to generate and transmit the second acknowledgement ACK2 or the fourth functional data FN4 to the second frequency hopping device 106b. Similarly, in response to the fifth functional data FN5, the third peer device 104c is further configured to generate and transmit the third acknowledgement ACK3 or the sixth functional data FN6 to the fixed frequency device 112.

FIGS. 2A-2D, collectively, represent a flow chart 200 that illustrates a method for facilitating AFH in the communication system 102 in accordance with an embodiment of the present disclosure. In the communication system 102, the first and second frequency hopping devices 106a and 106b are co-located with each other and with the fixed frequency device 112.

Figure 2A:
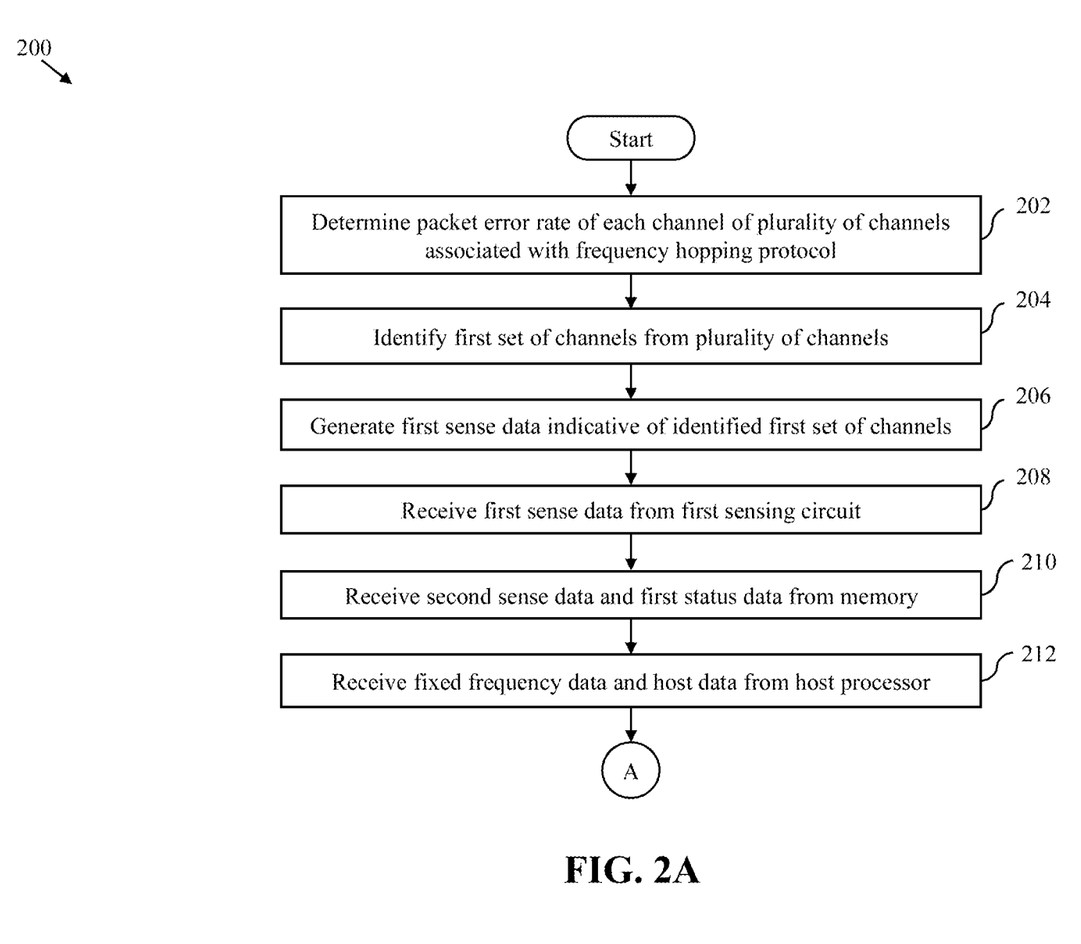
FIGS. 2A-2D, collectively, represent a flow chart that illustrates a method for facilitating adaptive frequency hopping (AFH) in a communication system of the wireless network environment of FIG. 1 in accordance with an embodiment of the present disclosure.

Referring now to FIG. 2A, at step 202, the first sensing circuit 114a determines a PER of each channel of the plurality of channels associated with the frequency hopping protocol. At step 204, the first sensing circuit 114a identifies the first set of channels from the plurality of channels. The first set of channels are identified such that a PER of each channel of the first set of channels is greater than the first threshold value. At step 206, the first sensing circuit 114a generates the first sense data SE1 that is indicative of the identified first set of channels. At step 208, the first controller 116a receives the first sense data SE1 from the first sensing circuit 114a.

At step 210, the first controller 116a receives the first status data ST1 and the second sense data SE2 from the memory 108. The first status data ST1 is indicative of the activation status of the second frequency hopping device 106b. Further, the second sense data SE2 is indicative of the second set of channels identified from the plurality of channels by the second frequency hopping device 106b such that a PER of each channel of the second set of channels is greater than the first threshold value. At step 212, the first controller 116a further receives the fixed frequency data FQ and the host data HT from the host processor 110. The host data HT is indicative of the third set of channels of the plurality of channels that is blocked for the AFH operations by the host processor 110. The fixed frequency data FQ is indicative of the fourth set of channels of the plurality of channels that is utilized by the fixed frequency device 112 and hence is unavailable for the AFH operations.

Figure 2B:
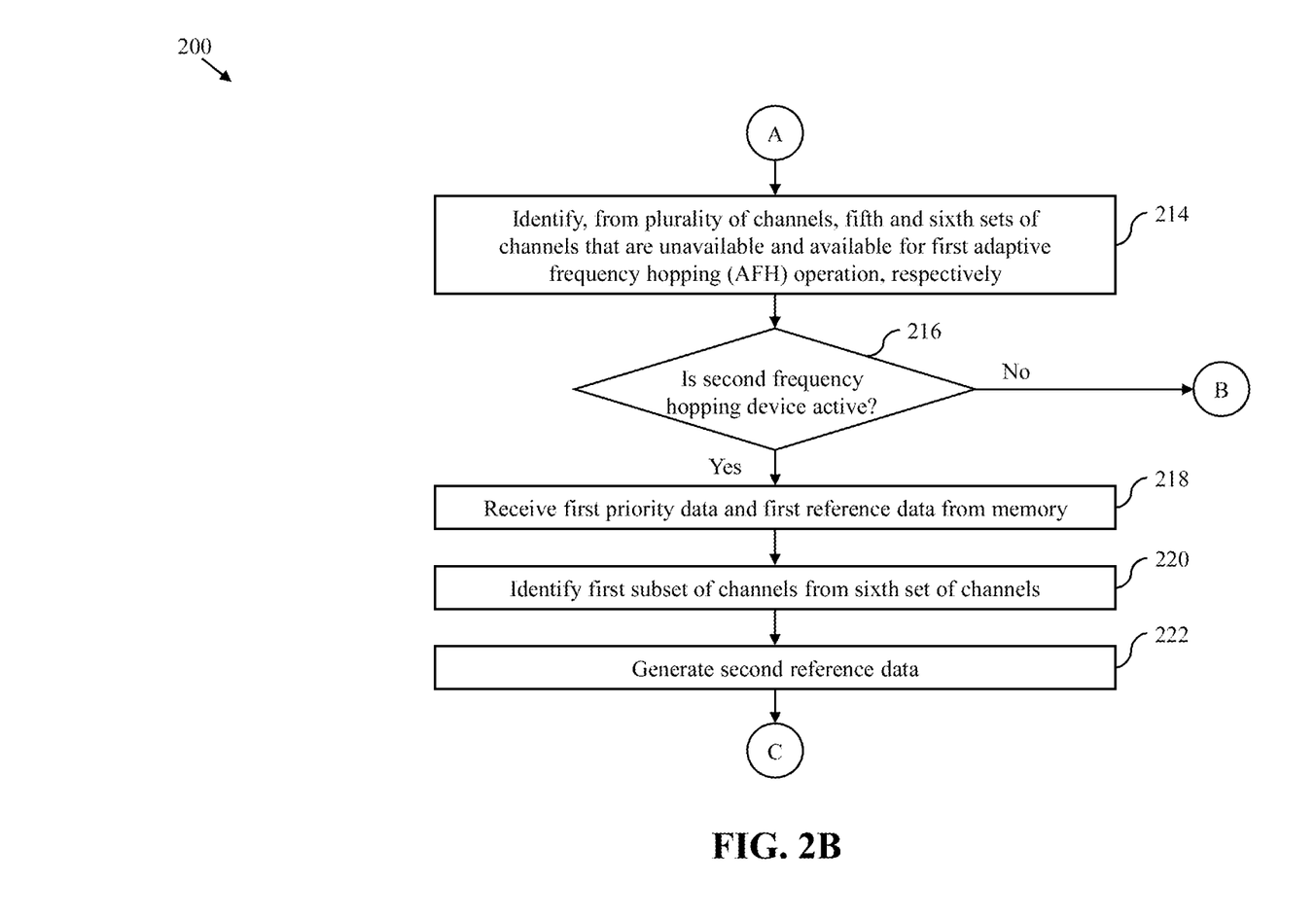

Referring now to FIG. 2B, at step 214, the first controller 116a identifies, from the plurality of channels, the fifth and sixth sets of channels that are unavailable and available for the first AFH operation, respectively. At step 216, the first controller 116a determines, based on the first status data ST1, whether the second frequency hopping device 106b is active. If at step 216, the first controller 116a determines that the second frequency hopping device 106b is active, step 218 is performed. At step 218, the first controller 116a receives the first priority data PR1 and the first reference data RF1 from the memory 108. At step 220, the first controller 116a identifies, from the sixth set of channels based on the first priority data PR1, the first subset of channels that is to be utilized by the second frequency hopping device 106b for the corresponding second AFH operation. At step 222, the first controller 116a generates the second reference data RF2 based on the first reference data RF1, the first subset of channels, and the fifth set of channels.

Figure 2C:
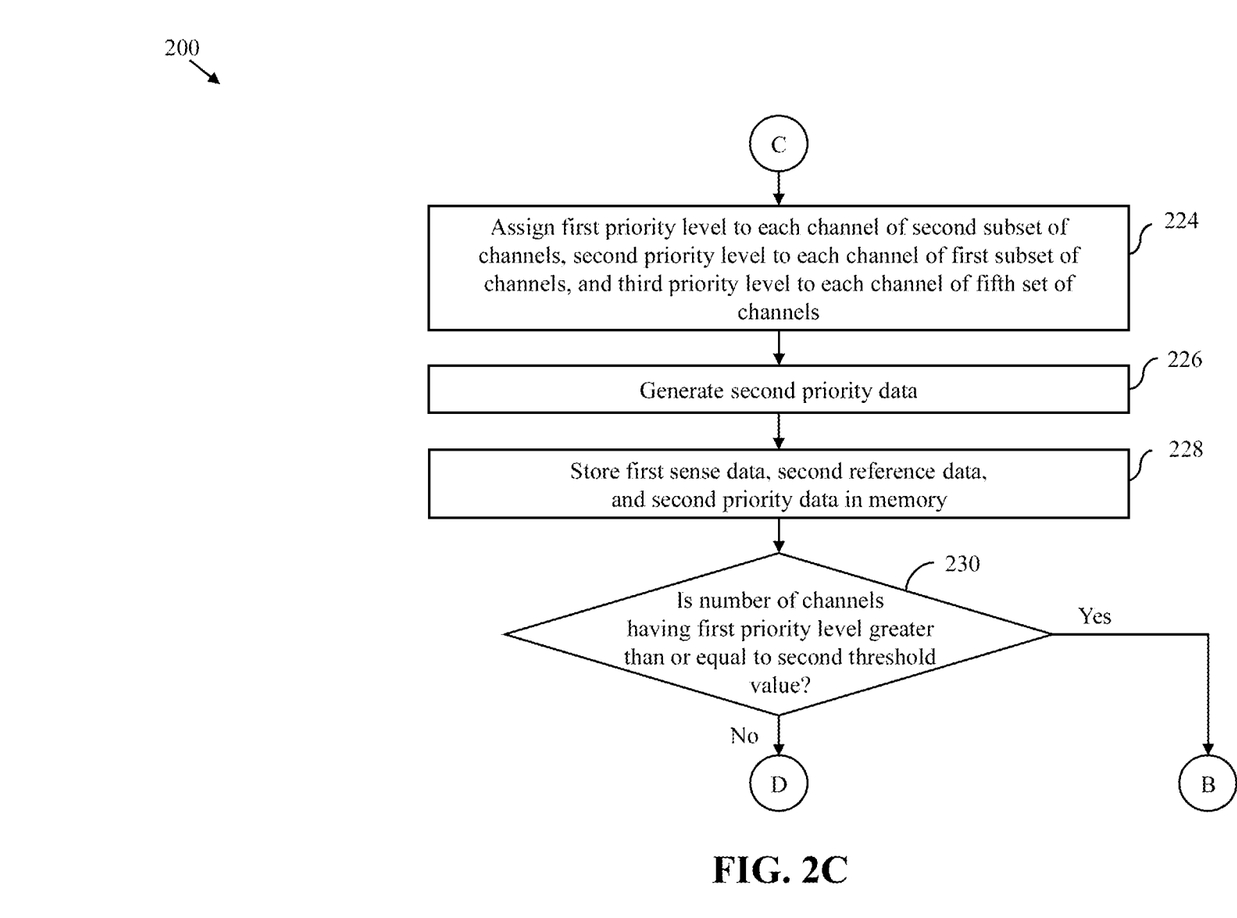

Referring now to FIG. 2C, at step 224, the first controller 116a assigns the first priority level to each channel of the second subset of channels of the sixth set of channels, the second priority level to each channel of the first subset of channels of the sixth set of channels, and the third priority level to each channel of the fifth set of channels. The first controller 116a assigns the first through third priority levels based on the second reference data RF2, the identified first subset of channels, the identified fifth set of channels, and the second subset of channels (i.e., remaining channels of the sixth set of channels). At step 226, the first controller 116a generates the second priority data PR2. At step 228, the first controller 116a stores the first sense data SE1, the second reference data RF2, and the second priority data PR2 in the memory 108. At step 230, the first controller 116a determines whether the number of channels having the first priority level is greater than or equal to the second threshold value. If at step 230, the first controller 116a determines that the number of channels having the first priority level is less than the second threshold value, step 232 is performed.

Figure 2D:
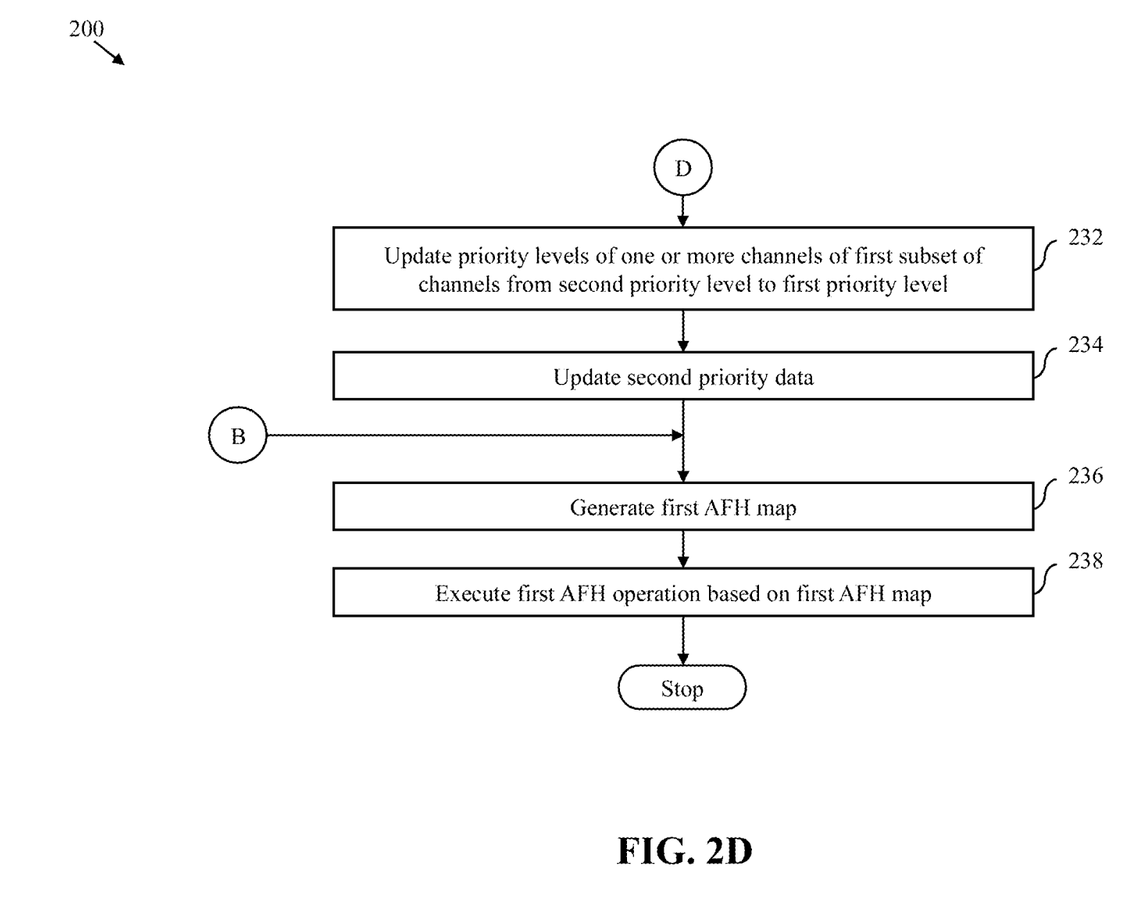

Referring now to FIG. 2D, at step 232, the first controller 116a updates the priority levels of the one or more channels of the first subset of channels from the second priority level to the first priority level, thereby increasing the number of available channels for the first AFH operation. The number of channels of the first subset of channels with the updated priority levels is equal to the difference between the second threshold value and the number of channels of the second subset of channels. At step 234, the first controller 116a updates the second priority data PR2 that is stored in the memory 108. At step 236, the first controller 116a generates the first AFH map. As the number of channels having the first priority level is less than the second threshold value, the first AFH map indicates that the second subset of channels and the one or more channels of the first subset of channels are to be utilized for the first AFH operation, and the remaining channels of the first subset of channels and the fifth set of channels are unavailable for the first AFH operation.

If at step 216, the first controller 116a determines that the second frequency hopping device 106b is inactive, step 236 is performed. In such a scenario, the first AFH map indicates that the sixth set of channels are to be utilized for the first AFH operation, and the fifth set of channels are unavailable for the first AFH operation. Further, if at step 230, the first controller 116a determines that the number of channels having the first priority level is greater than or equal to the second threshold value, step 236 is performed. In such a scenario, the first AFH map indicates that the second subset of channels is to be utilized for the first AFH operation, and the first subset of channels and the fifth set of channels are unavailable for the first AFH operation. At step 238, the first controller 116a executes the first AFH operation based on the first AFH map.

It will be apparent to a person skilled in the art that the second frequency hopping device 106b (i.e., the second sensing circuit 114b and the second controller 116b) generates the second AFH map and executes the second AFH operation in a manner similar to the generation of the first AFH map and the execution of the first AFH operation as described above, respectively.

Thus, each frequency hopping device of the communication system 102 (i.e., the first and second frequency hopping devices 106a and 106b) identifies a set of channels (e.g., the sixth set of channels) from the plurality of channels that is available for AFH operations, and assigns priority levels to each channel of the identified set of channels. The priority levels are assigned such that a subset of channels (i.e., the first subset of channels) of the set of channels that is to be utilized by a co-located frequency hopping device is assigned the second priority level (i.e., an intermediate priority level) and the remaining channels of the identified set of channels are assigned the first priority level (i.e., a highest priority level). Further, based on a number of channels having the first priority level, a corresponding AFH map (such as the first and second AFH maps) is generated. Thus, in the communication system 102 of the present disclosure, the AFH maps are dynamically generated based on the identification of channels that are unavailable for the AFH operations and channels that are utilized by co-located frequency hopping devices. As a result, a number of channels that is shared by multiple devices in the communication system 102 (such as the first and second frequency hopping devices 106a and 106b and the fixed frequency device 112) significantly reduces. Thus, a performance (i.e., a throughput) of a frequency hopping device of the present disclosure (i.e., the first and second frequency hopping devices 106a and 106b) is significantly greater than that of a conventional frequency hopping device that utilizes a predefined AFH map for executing a corresponding AFH operation.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

The invention claimed is:

1. A frequency hopping device co-located with a set of frequency hopping devices, the frequency hopping device comprising:
   a controller configured to:
      identify from a plurality of channels associated with a frequency hopping protocol, first and second sets of channels that are available and unavailable for an adaptive frequency hopping (AFH) operation associated with the frequency hopping device, respectively;
      identify from the first set of channels, a first subset of channels that is to be utilized by the set of frequency hopping devices for a set of AFH operations associated therewith;
      assign, based on the first subset of channels, a second subset of channels of the first set of channels, and the second set of channels, a first priority level to each channel of the second subset of channels;
      determine whether a number of channels having the first priority level is greater than or equal to a first threshold value;
      generate an AFH map associated with the frequency hopping device based on the determination of whether the number of channels having the first priority level is greater than or equal to the first threshold value; and
      execute the AFH operation based on the AFH map.

2. The frequency hopping device of claim 1, wherein when the controller determines that the number of channels having the first priority level is greater than or equal to the first threshold value, the AFH map indicates that the second subset of channels is to be utilized for the AFH operation, and the first subset of channels and the second set of channels are unavailable for the AFH operation.

3. The frequency hopping device of claim 1, wherein the controller is further configured to assign, based on the first subset of channels and the second set of channels, a second priority level to each channel of the first subset of channels and a third priority level to each channel of the second set of channels.

4. The frequency hopping device of claim 3, wherein when the controller determines that the number of channels having the first priority level is less than the first threshold value, the controller is further configured to update priority levels of one or more channels of the first subset of channels from the second priority level to the first priority level, wherein a number of channels with the updated priority levels is equal to a difference between the first threshold value and a number of channels of the second subset of channels, and wherein the AFH map indicates that the second subset of channels and the one or more channels of the first subset of channels are to be utilized for the AFH operation, and remaining channels of the first subset of channels and the second set of channels are unavailable for the AFH operation.

5. The frequency hopping device of claim 4, wherein the controller is further configured to generate first priority data that is indicative of the first through third priority levels assigned to the second and first subsets of channels and the second set of channels, respectively, and wherein the first subset of channels to be utilized by the set of frequency hopping devices is updated based on the first priority data.

6. The frequency hopping device of claim 1, further comprising a sensing circuit that is configured to:
   determine a packet error rate (PER) of each channel of the plurality of channels;
   identify a third set of channels from the plurality of channels such that a PER of each channel of the third set of channels is greater than a second threshold value; and
   generate first sense data that is indicative of the identified third set of channels.

7. The frequency hopping device of claim 6, wherein the controller is coupled with the sensing circuit and a host processor associated with the frequency hopping device, and further configured to:
   receive the first sense data from the sensing circuit; and
   receive host data from the host processor, wherein the host data is indicative of a fourth set of channels of the plurality of channels that is blocked for the AFH operation by the host processor, and wherein the controller identifies the first and second sets of channels based on the first sense data and the host data.

8. The frequency hopping device of claim 7, wherein the controller is further configured to receive second sense data that is indicative of a fifth set of channels identified from the plurality of channels by the set of frequency hopping devices such that a PER of each channel of the fifth set of channels is greater than the second threshold value, and wherein the controller further identifies the first and second sets of channels based on the second sense data.

9. The frequency hopping device of claim 7, wherein the controller is further configured to receive, from the host processor, fixed frequency data that is indicative of a sixth set of channels of the plurality of channels, wherein the sixth set of channels is utilized by a fixed frequency device that is co-located with the frequency hopping device and the set of frequency hopping devices, and wherein the controller further identifies the first and second sets of channels based on the fixed frequency data.

10. The frequency hopping device of claim 1, wherein the controller is further configured to receive second priority data that is indicative of one or more priority levels assigned to each channel of the plurality of channels by the set of frequency hopping devices, and wherein the controller identifies the first subset of channels from the first set of channels based on the second priority data.

11. A communication system, comprising:
a plurality of frequency hopping devices that are co-located with each other, wherein a frequency hopping device of the plurality of frequency hopping devices comprises:
a controller configured to:
identify from a plurality of channels associated with a frequency hopping protocol, first and second sets of channels that are available and unavailable for an adaptive frequency hopping (AFH) operation associated with the frequency hopping device, respectively;
identify from the first set of channels, a first subset of channels that is to be utilized by remaining frequency hopping devices of the plurality of frequency hopping devices for one or more AFH operations associated therewith;
assign based on the first subset of channels, a second subset of channels of the first set of channels, and the second set of channels, a first priority level to each channel of the second subset of channels;
determine whether a number of channels having the first priority level is greater than or equal to a first threshold value;
generate an AFH map associated with the frequency hopping device based on the determination of whether the number of channels having the first priority level is greater than or equal to the first threshold value; and
execute the AFH operation based on the AFH map.

12. The communication system of claim 11, wherein when the controller determines that the number of channels having the first priority level is greater than or equal to the first threshold value, the AFH map indicates that the second subset of channels is to be utilized for the AFH operation, and the first subset of channels and the second set of channels are unavailable for the AFH operation.

13. The communication system of claim 11, wherein the controller is further configured to assign, based on the first subset of channels and the second set of channels, a second priority level to each channel of the first subset of channels and a third priority level to each channel of the second set of channels.

14. The communication system of claim 13, wherein when the controller determines that the number of channels having the first priority level is less than the first threshold value, the controller is further configured to update priority levels of one or more channels of the first subset of channels from the second priority level to the first priority level, wherein a number of channels with the updated priority levels is equal to a difference between the first threshold value and a number of channels of the second subset of channels, and wherein the AFH map indicates that the second subset of channels and the one or more channels of the first subset of channels are to be utilized for the AFH operation, and remaining channels of the first subset of channels and the second set of channels are unavailable for the AFH operation.

15. The communication system of claim 14, wherein the controller is further configured to generate first priority data that is indicative of the first through third priority levels assigned the second and first subsets of channels and the second set of channels, respectively, and wherein the first subset of channels to be utilized by the remaining frequency hopping devices of the plurality of frequency hopping devices is updated based on the first priority data.

16. The communication system of claim 11, further comprising a host processor associated with the frequency hopping device, wherein:
the frequency hopping device further comprises a sensing circuit that is configured to:
determine a packet error rate (PER) of each channel of the plurality of channels;
identify a third set of channels from the plurality of channels such that a PER of each channel of the third set of channels is greater than a second threshold value; and
generate first sense data that is indicative of the identified third set of channels; and
the controller is coupled with the host processor and the sensing circuit, and further configured to:
receive the first sense data from the sensing circuit; and
receive host data from the host processor, wherein the host data is indicative of a fourth set of channels of the plurality of channels that is blocked for the AFH operation by the host processor, and wherein the controller identifies the first and second sets of channels based on the first sense data and the host data.

17. The communication system of claim 11, wherein the controller is further configured to receive second priority data that is indicative of one or more priority levels assigned to the plurality of channels by the remaining frequency hopping devices of the plurality of frequency hopping devices, and wherein the controller identifies the first subset of channels from the first set of channels based on the second priority data.

18. A method for facilitating adaptive frequency hopping (AFH) in a communication system, the method comprising:
identifying, by a frequency hopping device of the communication system, from a plurality of channels associated with a frequency hopping protocol, first and second sets of channels that are available and unavailable for an AFH operation associated with the frequency hopping device, respectively;
identifying, by the frequency hopping device from the first set of channels, a first subset of channels to be utilized by a set of frequency hopping devices of the communication system for a set of AFH operations associated therewith, wherein the set of frequency hopping devices is co-located with the frequency hopping device;
assigning, by the frequency hopping device based on the first subset of channels, a second subset of channels of the first set of channels, and the second set of channels, a first priority level to each channel of the second subset of channels;
determining, by the frequency hopping device, whether a number of channels having the first priority level is greater than or equal to a first threshold value;

generating, by the frequency hopping device, an AFH map associated with the frequency hopping device based on the determination of whether the number of channels having the first priority level is greater than or equal to the first threshold value; and executing, by the frequency hopping device, the AFH operation based on the AFH map.

19. The method of claim 18, wherein when the number of channels having the first priority level is greater than or equal to the first threshold value, the AFH map indicates that the second subset of channels is to be utilized for the AFH operation, and the first subset of channels and the second set of channels are unavailable for the AFH operation.

20. The method of claim 18, further comprising:

assigning, by the frequency hopping device based on the first subset of channels and the second set of channels, a second priority level to each channel of the first subset of channels and a third priority level to each channel of the second set of channels; and updating, by the frequency hopping device when the number of channels having the first priority level is less than the first threshold value, priority levels of one or more channels of the first subset of channels from the second priority level to the first priority level, wherein a number of channels with the updated priority levels is equal to a difference between the first threshold value and a number of channels of the second subset of channels, and wherein the AFH map indicates that the second subset of channels and the one or more channels of the first subset of channels are to be utilized for the AFH operation, and remaining channels of the first subset of channels and the second set of channels are unavailable for the AFH operation.

* * * * *